United States Patent
Aoki et al.

(10) Patent No.: US 9,196,160 B2
(45) Date of Patent: Nov. 24, 2015

(54) VEHICLE DETECTION APPARATUS AND VEHICLE DETECTION METHOD

(71) Applicant: KABUSHIKI KAISHA TOSHIBA, Minato-ku, Tokyo (JP)

(72) Inventors: Yasuhiro Aoki, Kawasaki (JP); Toshio Sato, Yokohama (JP); Yusuke Takahashi, Tama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 2 days.

(21) Appl. No.: 14/170,284

(22) Filed: Jan. 31, 2014

(65) Prior Publication Data

US 2014/0147008 A1    May 29, 2014

Related U.S. Application Data

(63) Continuation of application No. PCT/JP2012/069171, filed on Jul. 27, 2012.

(30) Foreign Application Priority Data

Aug. 3, 2011  (JP) .................................. 2011-170307

(51) Int. Cl.
*G06K 9/00* (2006.01)
*G08G 1/123* (2006.01)
(Continued)

(52) U.S. Cl.
CPC .............. *G08G 1/123* (2013.01); *G01B 11/002* (2013.01); *G01C 11/06* (2013.01); *G06T 7/0046* (2013.01); *G06T 7/0075* (2013.01); *G08G 1/0175* (2013.01); *G06K 9/00201* (2013.01);
(Continued)

(58) Field of Classification Search
CPC ............ G06K 9/3241; G06K 2209/23; G06K 9/3275; G06K 9/00201; G06K 9/00664; G06T 2207/30252
See application file for complete search history.

(56) References Cited

U.S. PATENT DOCUMENTS 5,487,116 A *  1/1996  Nakano et al. ................. 382/104
7,831,098 B2 * 11/2010  Melikian ....................... 382/215
(Continued)

FOREIGN PATENT DOCUMENTS

JP         06251284 A      9/1994
JP         8-83390 A       3/1996
(Continued)

OTHER PUBLICATIONS

International Search Report (ISR) dated Oct. 9, 2012 (and English translation thereof) issued in counterpart International Application No. PCT/JP2012/069171.
(Continued)

*Primary Examiner* — Bhavesh Mehta
*Assistant Examiner* — Jonathan S Lee
(74) *Attorney, Agent, or Firm* — Holtz, Holtz, Goodman & Chick PC

(57) ABSTRACT

A vehicle detection apparatus according to an embodiment comprises a controller detecting a vehicle from an image obtained by photographing the vehicle. The controller extracts a plurality of line-segment components indicating a boundary between a specific region of the vehicle and a vehicle body and included in the image. The controller measures a position of the vehicle based on coordinate information between the extracted line-segment components and photographing position information of the image.

10 Claims, 4 Drawing Sheets

(51) Int. Cl.
*G08G 1/017* (2006.01)
*G06T 7/00* (2006.01)
*G01B 11/00* (2006.01)
*G01C 11/06* (2006.01)
*G06K 9/32* (2006.01)

(52) U.S. Cl.
CPC .......... *G06K9/00664* (2013.01); *G06K 9/3275* (2013.01); *G06K 2209/23* (2013.01); *G06T 2207/10012* (2013.01); *G06T 2207/30236* (2013.01)

(56) References Cited

U.S. PATENT DOCUMENTS

| | | | | |
|---|---|---|---|---|
| 8,108,119 | B2* | 1/2012 | Southall et al. | 701/96 |
| 8,897,497 | B2* | 11/2014 | Shiraishi et al. | 382/104 |
| 8,965,056 | B2* | 2/2015 | Matsuda et al. | 382/106 |
| 2006/0165277 | A1* | 7/2006 | Shan et al. | 382/159 |
| 2007/0127779 | A1* | 6/2007 | Miyahara | 382/106 |
| 2008/0219505 | A1* | 9/2008 | Morimitsu | 382/103 |
| 2012/0069183 | A1 | 3/2012 | Aoki et al. | |
| 2014/0146176 | A1* | 5/2014 | Hayakawa et al. | 348/148 |

FOREIGN PATENT DOCUMENTS

| | | |
|---|---|---|
| JP | 2003-208692 A | 7/2003 |
| JP | 2007-265322 A | 10/2007 |
| JP | 2008033818 A | 2/2008 |
| JP | 2008129920 A | 6/2008 |
| JP | 2009212810 A | 9/2009 |
| JP | 2009-290278 A | 12/2009 |
| JP | 2010-256040 A | 11/2010 |

OTHER PUBLICATIONS

U.S. Appl. No. 13/232,525, First Named Inventor: Yasuhiro Aoki, Title: "Vehicle Detection Apparatus", Filed: Sep. 14, 2011.
International Preliminary Report on Patentability (IPRP) dated Feb. 13, 2014 issued in International Application No. PCT/JP2012/069171.
Extended European Search Report dated Feb. 27, 2015, issued in counterpart European Application No. 12819961.9.

* cited by examiner

VEHICLE DETECTION APPARATUS AND VEHICLE DETECTION METHOD

CROSS-REFERENCE TO RELATED APPLICATIONS

This application is a Continuation application of PCT Application No. PCT/JP2012/069171, filed Jul. 27, 2012 and based upon and claiming the benefit of priority from prior Japanese Patent Application No. 2011-170307, filed Aug. 3, 2011, the entire contents of all of which are incorporated herein by reference.

FIELD

Embodiments described herein relate generally to a vehicle detection apparatus and a vehicle detection method.

BACKGROUND

For example, in tollgates of expressways, passage of a vehicle is generally detected by a pole sensor (a vehicle detection apparatus) of a transmission type and a reflection type using infrared laser.

However, there are various types of vehicles having different shapes, and the length from the distal end portion of the vehicle detected by the pole sensor to a specific region (for example, a part around a windshield on which an on-board device is installed) differs for each type of vehicle. Thus, it is difficult to detect a specific region by the pole sensor.

In addition, pole sensors require excavation in installment, and require separate equipment to adjust positions of the left and right sensors. Thus, pole sensors have a disadvantage of requiring high cost for construction and adjustment. Thus, pole sensors may be desirably replaced with vehicle detecting apparatuses of other means.

On the other hand, vehicle detection apparatuses using cameras relatively easily achieve conditions for making the vehicle fall within a range of angle of view, by using existing pole sensors. The price of cameras has fallen in recent years, and thus cameras are available at a relatively low price. It is thus preferable to achieve a vehicle detection apparatus using a camera.

A vehicle detection apparatus of a stereoscopic type using a plurality of cameras will now be discussed. Generally, the feature points of a vehicle differ according to the shape of the vehicle and how the vehicle looks. Thus, in a stereoscopic system, the feature points that are correlated with one another between a plurality of images obtained by a plurality of cameras change each time, and the criteria for alignment are indistinct.

As described above, vehicle detection apparatuses adopting a stereoscopic system have a disadvantage that feature points that are correlated with one another between a plurality of images change each time, and the criteria for positioning are indistinct.

DETAILED DESCRIPTION

One embodiment is to provide a vehicle detection apparatus that can clarify the criteria for alignment by determining feature points that are correlated with one another between a plurality of images, and improve vehicle detection accuracy. According to one embodiment, a vehicle detection apparatus according to an embodiment comprises a detecting module detecting a vehicle from an image obtained by photographing the vehicle, an extracting module, and a measuring module. The extracting module extracts a plurality of line-segment components indicating a boundary between a specific region of the vehicle and a vehicle body and included in the image. The measuring module measures a position of the vehicle based on coordinate information between the extracted line-segment components and photographing position information of the image.

Embodiments will now be explained hereinafter, with reference to drawings.

A matter common to the embodiments is a configuration for extracting a windshield region from left and right camera images, and in particular the windshield region (a polygonal approximate region) of the vehicle. Another matter common to the embodiments is a configuration that enables a stereoscopic view of the vehicle, and achieving highly-accurate vehicle detection, by correlating the left and right noted characteristics with each other, using line-segment components forming the windshield region as characteristic amounts.

First Embodiment

Figure 1:
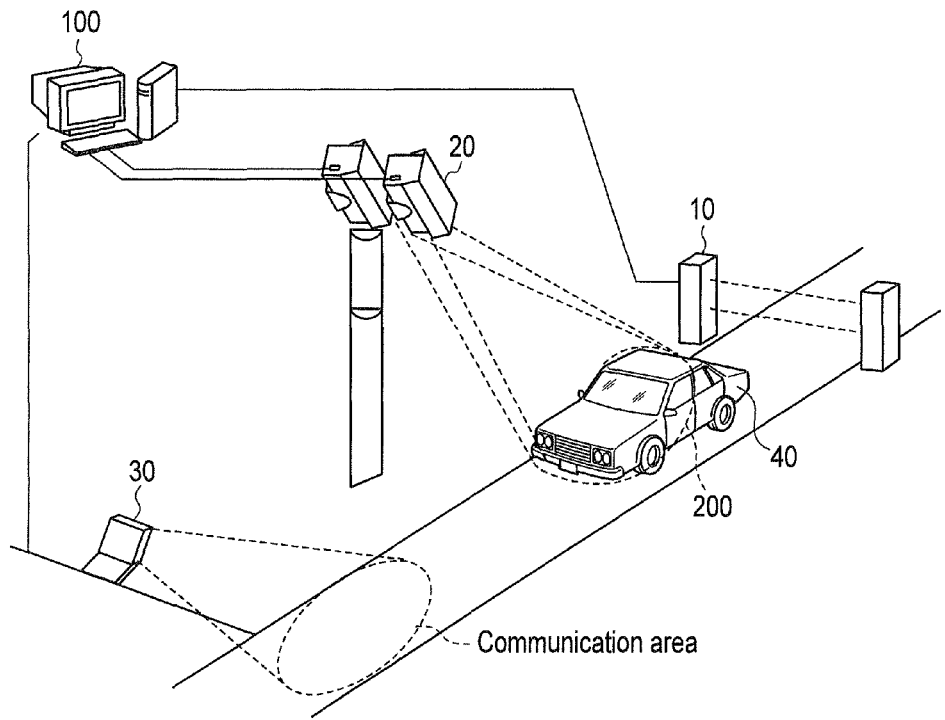
FIG. 1 is a schematic diagram illustrating a configuration of a vehicle detection system, to which a vehicle detection apparatus according to a first embodiment is applied.

FIG. 1 is a schematic diagram illustrating a configuration of a vehicle detection system, to which a vehicle detection apparatus 100 according to the present embodiment is applied. As illustrated in FIG. 1, the vehicle detection system comprises a pole sensor 10, an electronic camera 20, an ETC (Electronic Toll Collection) system 30, and the vehicle detection apparatus 100.

The pole sensor 10 detects a vehicle 40 entering an ETC lane by using an optical sensor or a tread sensor, and notifies the vehicle detection apparatus 100 of a result of the detection.

The electronic camera (hereinafter simply referred to as "camera") 20 is formed of left and right digital cameras to photograph the vehicle 40 in left and right directions with respect to a running direction of the vehicle 40. Specifically, the digital cameras in the camera 20 are installed in a line in the lateral direction and in a position above and in front of the running direction of the vehicle 40. Each of the digital cameras takes a moving image of the vehicle 40 running on the ETC lane and passing through the pole sensor 10, at a preset frame rate. Thus, the camera 20 takes and outputs a plurality of images for the vehicle 40 running on the ETC lane.

In the following explanation, a windshield is referred to as an example of a specific region of the vehicle 40. Thus, the camera 20 is installed in a position where it can shoot a panoramic view at least including the windshield of the vehicle 40. In addition, the camera 20 is installed to include the windshield and side surfaces of the vehicle 40 in a visual-field area 200 as a photographing position. Each of the digital cameras of the camera 20 may be arranged side by side along a direction almost parallel with the longitudinal direction of upper and lower sides of the windshield of the vehicle 40. For example, there are cases where the vehicle 40 enters or leaves the ETC lane inclined with respect to the optical axis of the camera 20. In such a case, line-segment components indicating the boundary between the windshield region and the vehicle body of the vehicle 40 are uniformly inclined, and thus the left and right digital cameras may be installed inclined in a direction orthogonal to a representative line-segment component thereof.

The camera 20 may be configured to optically acquire left and right images of the vehicle 40 with a lens, instead of the left and right digital cameras. For example, the camera 20 may have a structure capable of simultaneously branching images from two directions with special lenses of a camera. Specifically, the camera is configured to use a wedge prism polarization system in which two lenses are arranged at, for example, an inlet of light, and a prism that bends the optical path is disposed inside.

The camera 20 transmits image data including a time code that indicates the photographing time to the vehicle detection apparatus 100. The camera 20, the vehicle detection apparatus 100 and the other device (30) have synchronized time information. The image data output from the camera 20 may not include any time code indicating the photographing time, in the case of adopting a structure in which the camera 20 and the vehicle detection apparatus 100 and the other device operate in synchronization, and the vehicle detection apparatus 100 and the other device can recognize the photographing time of the camera 20.

The ETC system 30 is a system configured to automatically collect a toll for the vehicle 40 running on a toll road such as an expressway. The ETC system 30 obtains information for identifying the passing vehicle 40, by wireless communication with an ETC in-vehicle unit mounted on the vehicle 40. Generally, an ETC in-vehicle unit has an antenna for performing wireless communications, and the antenna is installed in a position which can be visually recognized through the windshield of the vehicle 40. Thus, since the position of the windshield is accurately specified, the ETC system 30 can perform highly accurate wireless communication with the ETC in-vehicle unit.

Figure 2:
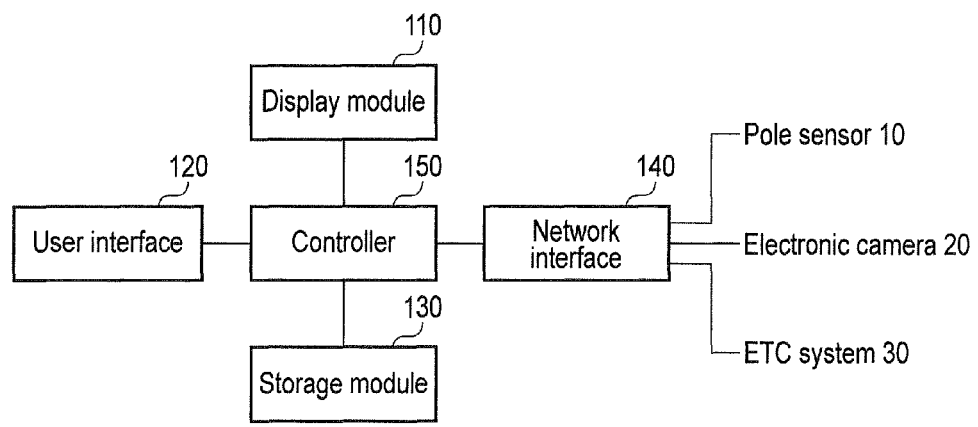
FIG. 2 is a block diagram illustrating a configuration of the vehicle detection apparatus according to the first embodiment.

Next, as illustrated in FIG. 2, the vehicle detection apparatus 100 includes a display module 110, a user interface 120, a storage module 130, a network interface 140, and a controller 150.

The display module 110 is a display device using an LCD (Liquid Crystal Display) or the like, and displays various information items such as an operation state of the vehicle detection apparatus 100. The user interface 120 is an interface that receives user instructions via input devices such as a keyboard, a mouse, and a touch panel. The storage module 130 stores control programs and control data for the controller 150, and is formed of one or a plurality of storage devices, such as HDDs (hard disk drive), RAMS (random access memory), ROMs (read only memory), and flash memories. The network interface 140 is connected to a network such as a LAN, and communicates with each of the pole sensor 10, the camera 20, and the ETC system 30 through the network.

The controller 150 includes a microprocessor, and operates based on the control programs and control data stored in the storage module 130. The controller 150 serves as a supervising controller for the vehicle detection apparatus 100. The controller 150 detects a specific region of the vehicle 40 that is set with the control data in advance, based on the image obtained by the camera 20, and executes processing of specifying the position of the vehicle 40 in real space. The controller 150 may execute processing of predicting the passage time (the time at which the vehicle 40 passes through the communication area of the ETC system 30) in real space, together with specifying the position of the vehicle 40.

The controller 150 has the following functions (f1) to (f4), to execute the processing of specifying the position of the vehicle 40.

The function (f1) is a vehicle detecting function of detecting entry of the vehicle 40 from the left and right images obtained from the camera 20 formed of left and right digital cameras. Background subtraction and pattern matching are used for the vehicle detecting function. However, the vehicle detecting function of the camera 20 can be omitted, since the object detected by the pole sensor 10 is the vehicle 40 in many cases.

Figure 3:
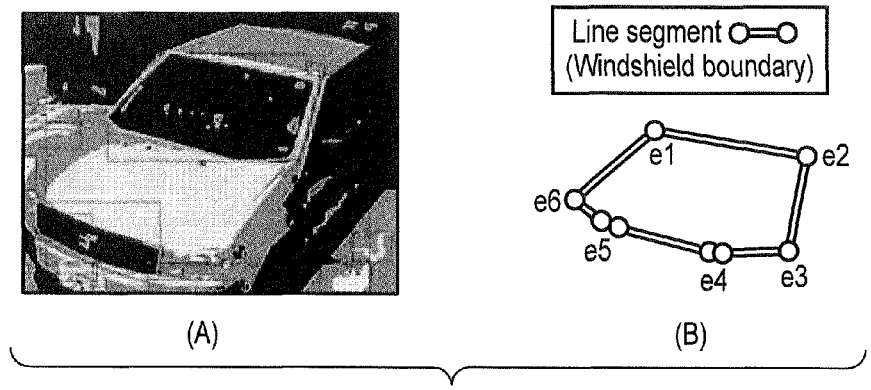
FIG. 3 is a schematic diagram illustrating a windshield region and line segment components thereof in the first embodiment.

The function (f2) is a line-segment component extracting function of extracting a plurality of line-segment components indicating the boundary between the windshield region and the vehicle body of the vehicle 40 and included in the image, for each of the left and right images obtained by photographing the vehicle 40. Specifically, for example, the line-segment component extracting function is a function of extracting a plurality of line-segment components e1 to e6 indicating the boundary between the windshield region and the vehicle body as illustrated in FIG. 3 (B), for a photograph image illustrated in FIG. 3 (A).

The function (f3) is a polygon approximation function of performing approximation with a polygon forming a closed loop using some of the line-segment components extracted from the image, for each of the left and right images. As a supplementary explanation, the closed loop corresponding to the windshield region is formed of a combination of the line-segment components e1 to e6 extracted by the line-segment component extracting function. The line-segment component extracting function and the polygon approximation function can be achieved by, for example, the method disclosed in a Japanese Patent Application Publication (Jpn. Pat. Appln. No. 2010-208539).

The function (f4) is a function of aligning at least one line-segment component, in the line-segment components e1 to e6 forming the closed loop for each of the left and right images, with each other between the left and right images. In addition, the function (f4) is a measuring function of measuring the position of the closed loop as the position of the vehicle, based on coordinate information between the aligned line-segment components and photographing position information (the position where the camera 20 is placed) indicating the photographing position where the left and right images are photographed.

The measuring function of the function (f4) may include processing of aligning all the line-segment components forming the closed loop. For example, the processing involves matching all the windshield regions of the left and right images to correlate the left and right representative points with each other, in the case where the windshield of the vehicle 40 has many curved faces and it is difficult to determine a representative line-segment component (at least one line-segment component).

Next, operation of a vehicle detection system, to which the vehicle detection apparatus 100 of the present embodiment is applied, will be explained hereinafter with reference to the flowchart of FIG. 4.

Figure 4:
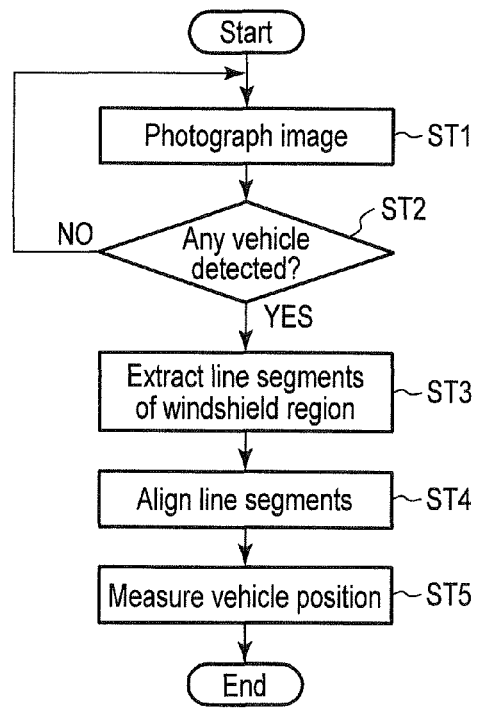
FIG. 4 is a flowchart for explaining operation according to the first embodiment.

When the vehicle detection apparatus 100 is powered and started, the vehicle detection apparatus 100 repeatedly executes the steps (ST2 to ST5) illustrated in FIG. 4 until the power is turned off. These steps are executed by operation of the controller 150.

Prior to startup of the vehicle detection apparatus 100, the pole sensor 10 and the camera 20 are started. Thereby, the pole sensor 10 starts monitoring entry of the vehicle 40 into the ETC lane, and notifies the vehicle detection apparatus 100 of a detection result, until the power is turned off. The camera 20 starts photographing at a predetermined frame rate, and transmits the obtained image data to the vehicle detection apparatus 100 until the power is turned off (ST1). Thereby, the controller 150 receives image data obtained by the camera 20.

The controller 150 executes the vehicle detecting function of determining whether the object detected by the pole sensor 10 is a vehicle or not, in response to notification from the pole sensor 10 through the network interface 140. Specifically, the controller 150 detects entry of the vehicle 40, based on results of background subtraction processing and pattern matching processing performed for the left and right images obtained from the camera 20 (ST2).

The left and right digital cameras of the camera 20 are placed such that the windshield region can be photographed with at least a plurality of frames for the vehicle 40 running in the angle of view of the camera. The controller 150 presets on the screen an observed region, for which it is determined whether a vehicle has entered or not, and detects changes in image in the region by background subtraction or the like. The controller 150 determines whether the detected object is a vehicle or not, by setting a part including the observed region as a search region, and matching the search region with a vehicle front pattern (lights, front grille, and number plate) prepared in advance. As another method, a number plate being a characteristic of the vehicle may be detected.

When entry of the vehicle 40 is detected, the controller 150 goes to the step of extracting line segments of the windshield region as follows (YES of ST2, and ST3). When no entry of vehicle 40 is detected, the controller 150 continues monitoring of vehicle entry (NO of ST2).

The controller 150 extracts an image data item of a frame photographed at a predetermined time among a plurality of image data items transmitted from the camera 20, through the network interface 140. The extracted image data item is referred to as image data to be processed. The predetermined time is determined in consideration of the positional relation (distance) between the position where the pole sensor 10 is installed and the angle of view (photographing range) of the camera 20, and the assumed passing speed of the vehicle, such that image data including the specific region of the vehicle 40 can be extracted.

The controller 150 performs preprocessing for the image data to be processed. Specifically, the preprocessing includes noise reduction performed for the purpose of improving the S/N ratio. The image is sharpened by the noise reduction. The preprocessing also includes filtering to improve image contrast. The preprocessing also includes image distortion correction for the purpose of correcting the image.

The controller 150 extracts a plurality of line-segment components e1 to e6 indicating the boundary between the windshield region and the vehicle body of the vehicle 40, from the image data to be processed that has been subjected to preprocessing, using a method such as Hough transform (ST3). Specifically, the controller 150 extracts a plurality of line-segment components e1 to e6 indicating the boundary included in the image, for each of the left and right images, for which entry of the vehicle 40 has been detected.

As a specific extraction algorithm of Step ST3, for example, eight-direction line-segment components based on horizontal and vertical directions in the image are extracted, when the vehicle 40 is photographed from above. Thereby, a number of line-segment components including a windshield boundary part are extracted. Since a part of a windshield around wipers is curved in many cases, it is difficult to extract the boundary with one line-segment component. Thus, generally, it is possible to perform processing of approximating the shape of the windshield by extracting the boundary as a polygon or lines obtained by combining a plurality of line-segment components. For example, when a circle is approximated with line-segment components, it can be approximated with an inscribed equilateral octagon. An error in this case corresponds to a difference in area between the circle and the inscribed equilateral octagon, and is permissible as an error in practical design.

The controller 150 performs Hough transform for the image data to be processed and image data items of previous and following frames, and extracts time-successive line-segment components from the images. The controller 150 may execute geometric change prediction with movement of the vehicle 40 from the line-segment components, and obtain line-segment components at the predetermined time (the photographing time of the image data to be processed). Using image data items of a plurality of frames like this can improve the extraction accuracy.

Although the processing of extracting the line-segment components using a method such as Hough transform has been explained, when color information is included in the image data to be processed, the image based on the image data to be processed may be divided into regions of similar colors based on the color information, and boundaries between the regions may be extracted as line-segment components. Also by such a method, a boundary between the windshield and the other regions of the vehicle can be extracted as line-segment components.

The controller 150 executes approximation with a polygon that forms the closed loop using some of the line-segment components extracted in Step ST3 for each of the left and right images, and generates candidates for the windshield region. Elements extracted from the image by polygon approximation are the windshield region, a shadow region cast on the windshield, a reflection region including reflected light from the sun, pillars being a part of the vehicle, and windows for the driver's seat and the front seat next to the driver. Actually, a closed loop with a complicated shape is formed with a plurality of line-segment components.

Although the simplest shape of the windshield region can be approximated to a rectangle, the windshield region can be approximated to a shape including curves according to the shape of the windshield. Even if the windshield has a simple shape, when it is photographed from the side of the vehicle, a depth occurs between the left and right sides of the windshield and asymmetry is generated.

At this point in time, it has not been recognized which line-segment component is a part of the windshield region. An optimum solution exists in a combination of closed loops including the line-segment components indicating the boundary between the windshield and the vehicle body by the polygon approximation. Thus, the controller 150 performs evaluation for a plurality of closed loops generated by polygon approximation, using an evaluation function, and narrows down the candidates to one that accurately approximates the windshield region.

Actually, there may be parts with high curvature or parts with insufficient contrast of boundaries, and there may be candidates that partly lack line-segment components. Thus, the evaluation may be performed after performing approximation to supplement the loss part with a line-segment component. For example, according to the photographing angle, one of the pillars may be concealed by the windshield. In such a case, the windshield end part on the side of the concealed pillar is supplemented with a line-segment component, to complete the closed loop.

In addition, various pillar patterns are stored in advance in the storage module 130, and a plurality of windshield region candidates are correlated with each pattern and stored in the storage module 130. Then, a closed loop similar to the pillar may be detected from polygon approximation, the pillar may be detected by pattern matching between the detected closed loop and the information stored in the storage module 130, and windshield region candidates correlated with the detected pillar may be obtained.

The controller 150 performs a plurality of different evaluations for each of the windshield region candidates obtained as described above, and determines a total of scores of the evaluations for each windshield region candidate. The evaluations include a first method of providing the candidates with scores in consideration of the position and size of the windshield in the image. The evaluations include a second method of providing the candidates with scores based on brightness distributions around the line-segment components forming the windshield region. The evaluations also include a third method of providing the candidates with scores based on the degree of matching with a windshield template stored in advance in the storage module 130. When a polygon appears in the windshield region due to reflection or shadows, the polygon is provided with low scores by the first method and the third method.

The controller 150 selects an optimum windshield region based on the totals of the scores as described above. The controller 150 checks the positional relation between the selected windshield region and a front mask part (lights, grille, number plate) included in the image data to be processed, and examines whether there are any contradictions (for example, whether there is a large shift in a lateral direction between the windshield region and the front mask part). When there is a contradiction, the same examination is performed for the windshield region having the second highest total score. The position of the vehicle front mask part is determined by pattern matching of elements forming the front mask part.

Next, when the controller 150 extracts a plurality of line-segment components indicating the boundary between the windshield region and the vehicle body for each of the left and right images, the controller 150 performs processing of aligning at least one line-segment component between the left and right images (ST4). Specifically, the controller 150 aligns at least one line-segment component among line-segment components forming a closed loop for each of images of the image data to be processed between the left and right images.

Thereafter, the controller 150 measures the position of the closed loop as the position of the vehicle 40, based on coordinate information between the aligned line-segment components and photographing information indicating the photographing position where the left and right images are photographed (ST5).

Figure 5:
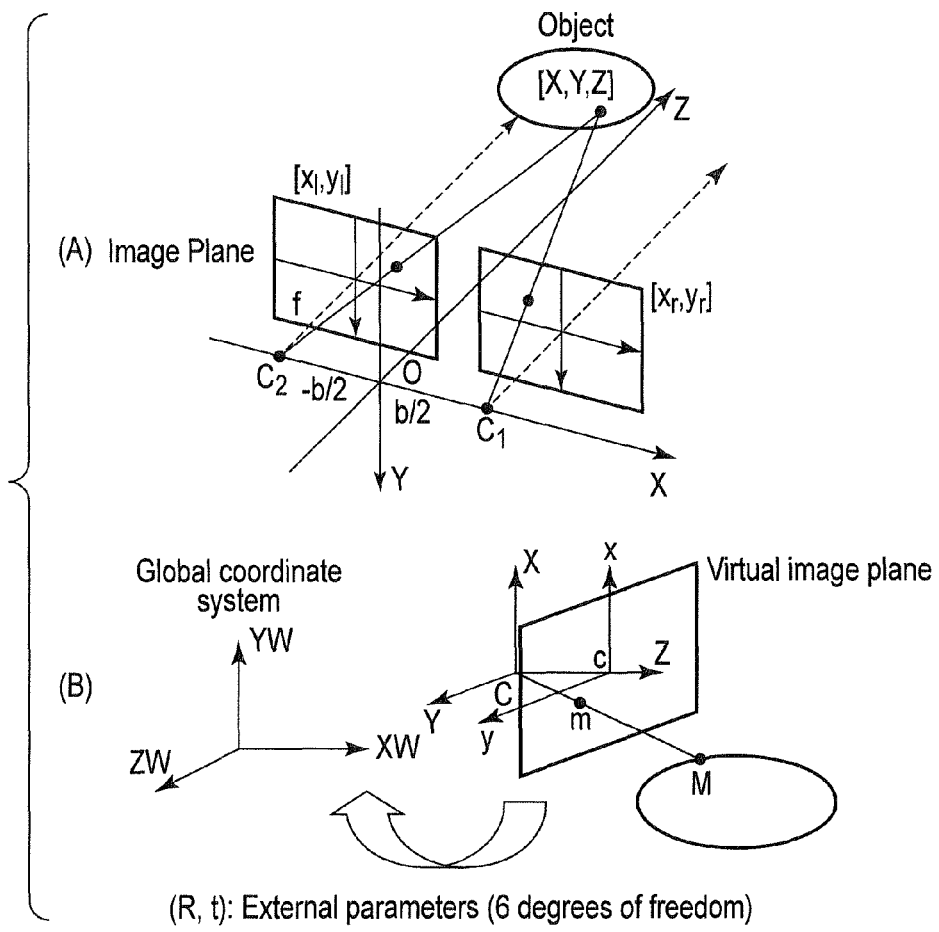
FIG. 5 (A) is a diagram illustrating a stereoscopic camera model in the first embodiment, and FIG. 5 (B) is a diagram illustrating a relation between a camera coordinate system and a global coordinate system.

Specifically, as illustrated in FIG. 5 (A) and FIG. 5 (B), the controller 150 converts camera coordinates (coordinates on a virtual image plane) obtained by obtaining a difference between coordinate information items into a global coordinate system (position in real space on the ETC lane), and thereby calculates the position of the line-segment components of the windshield region. The calculated position corresponds to the position of the vehicle to be measured in Step ST5.

Reference symbols $C_1$ and $C_2$ illustrated in FIG. 5 (A) indicate photographing positions (intersection points between the X axis of the photographing plane coordinate system and the optical axes of the left and right cameras) of the left and right cameras in the camera coordinate system using an intermediate point between the left and right cameras of the camera 20 as an origin O. The left and right cameras are two cameras having the same specifications, and placed in parallel with each other and at equivalent positions. Thus, the optical axes of the two cameras are made parallel so that their imaging planes agree with each other, and so that the horizontal axes of the imaging planes agree with each other. A reference symbol b indicates an interval between the left and right cameras. A reference symbol f indicates a focal distance. Reference symbols $[x_l, y_l]$ and $[x_r, y_r]$ are coordinates of points (such as end points) corresponding to each other in the aligned line segment in imaging plane coordinate systems on the left and right images ("Image Plane" in the drawing), using intersection points with the optical axes (broken-line arrows in the drawing) of the right and left cameras as origins.

Objects [X, Y, Z] are coordinates of the corresponding points in the camera coordinate system, and have the following relation.

$Z = b \cdot f / (x_l - x_r)$ $X = Z \cdot x_r / f$ $Y = b \cdot y_r / f$

Reference symbols R and t illustrated in FIG. 5 (B) are external parameters to associate the camera coordinates with the global coordinates. The reference symbol R indicates a rotation matrix. Reference numeral t indicates a parallel movement vector.

The controller 150 notifies the ETC system 30 of the vehicle position (coordinates) measured in Step ST5 through the network interface 140. The ETC system 30 transmits and receives wireless signals to and from an antenna of the ETC in-vehicle unit mounted on the windshield, based on the position (coordinates) of the vehicle 40 and the assumed passing speed of the vehicle 40.

As described above, according to the present embodiment, the controller 150 aligns at least one of line-segment components of the left and right images among line-segment components forming a closed loop using line-segment components indicating the boundary between the windshield region and the vehicle body of the vehicle 40. Thereby, the alignment standard can be clarified by determining feature points that are to be correlated with each other between images from the camera 20, and thus the accuracy of detecting the vehicle 40 can be improved.

Specifically, line-segment components of the vehicle windshield region boundary part are extracted from the left and right camera images, the representative line-segment components of the left and right images are correlated with each other, and thereby three-dimensional measurement of the vehicle 40 can be achieved with high accuracy. In addition, when it is applied to the ETC system 30, the ETC in-vehicle unit is placed in the vicinity of the windshield, and thus the positional relation with the in-vehicle unit to communicate with and the distance from the in-vehicle unit can be accurately extracted. Further, information corresponding to the width and the height of the vehicle can be deductively determined, based on positional information of the windshield.

In addition, according to the present embodiment, the controller 150 extracts a plurality of line-segment components forming a vehicle image from image data obtained by photographing the vehicle, and executes approximation with a polygon for generating a closed loop by using the line-segment components. Thereby, the controller 150 generates a plurality of candidates for a region of a specific part (for example, windshield) of the vehicle 40, performs a plurality of different evaluations for the candidates, and specifies a most probable vehicle specific part region. Thus, since the above specific part can be detected by image processing as long as the specific part of the target vehicle 40 is imaged, the camera 20 can be installed with a high degree of freedom, and a high detection accuracy can be obtained.

Second Embodiment

Figure 6:
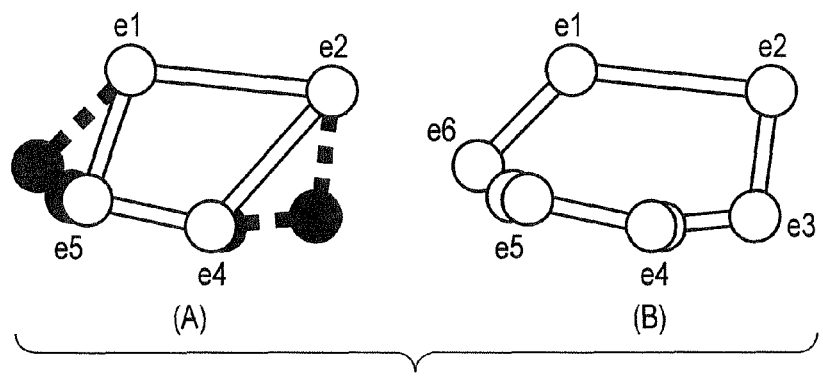
FIG. 6 (A) is a schematic diagram illustrating rough approximation of a windshield in a second embodiment, and FIG. 6 (B) is a schematic diagram illustrating fine approximation thereof.
Figure 7:
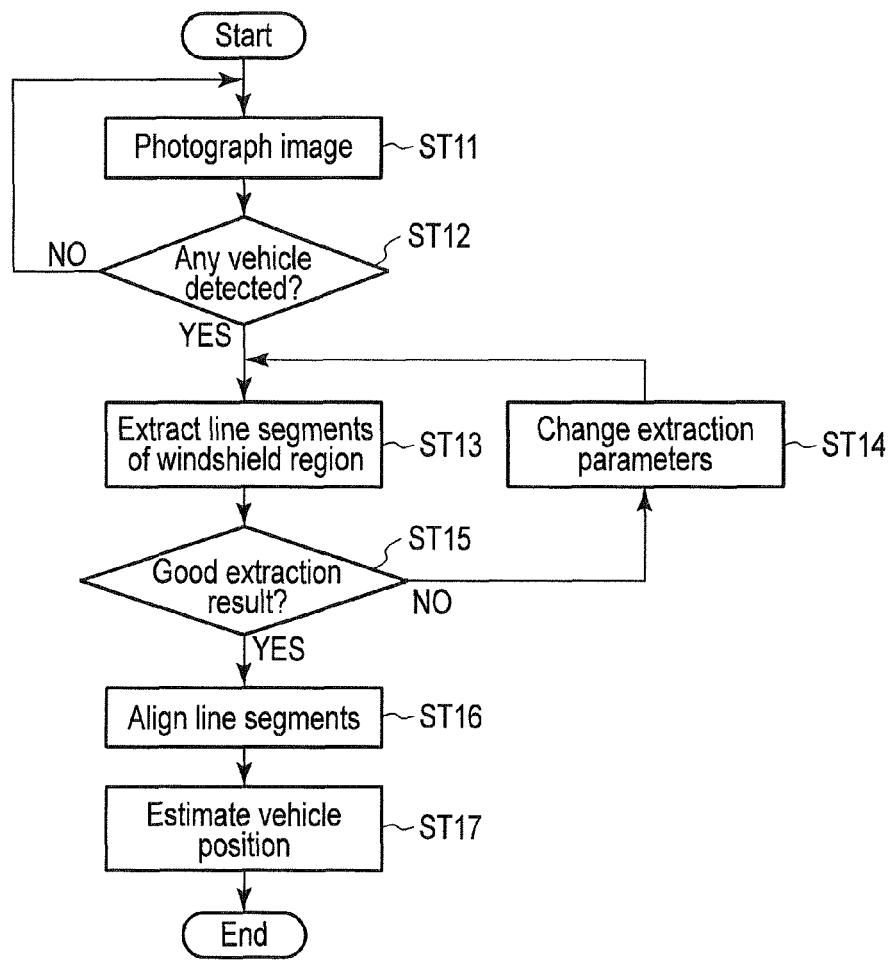
FIG. 7 is a flowchart for explaining operation according to the second embodiment.

FIG. 6 and FIG. 7 are diagrams for explaining a second embodiment. A vehicle detection apparatus 100 and a vehicle detection system according to the present embodiment are the same as those of the first embodiment explained with reference to FIG. 1 and FIG. 2, and thus explanation thereof will be omitted.

In the present embodiment, a controller 150 has a configuration that includes a re-executing function (f2-1) in a line-segment extracting function (f2) to extract line-segment components of a windshield region.

The re-executing function (f2-1) is a function of classifying extracted line-segment components according to directions, and re-executing the processing of extracting a plurality of line-segment components based on the number and length of the line-segment components for each direction. Specifically, as illustrated in FIG. 6 (A) and FIG. 6 (B), the re-executing function (f2-1) includes changing parameters used in extraction of the line-segment components to increase the number of the line-segment components and reduce the length of the line-segment components, and re-executing the processing of extracting the line-segment components based on the changed parameters.

By adding the re-executing function (f2-1) as described above, parameters such as the size of the edge filter are changed in the processing of extracting line-segment components being constituent elements of the windshield region, and thereby the extraction rate for the line-segment components can be improved. The extraction rate for the line-segment components can be determined based on an extraction result (the number and length of line-segment components for each direction). The extraction rate for the line-segment components can be calculated as a proportion of the actual extraction result in the expected extraction result, with respect to the number and length of line-segment components for each direction.

In addition, as illustrated in FIG. 6 (A), when the size of the windshield region is greater than a reference size, the re-executing function (f2-1) reduces the number of line-segment components and increases the length of the line-segment components. On the other hand, as illustrated in FIG. 6 (B), when the size of the windshield region is equal to or less than the reference size, the re-executing function (f2-1) may be configured to include a function of changing the parameters used in extraction of line-segment components to increase the number of the line-segment components and reduce the length of the line-segment components.

Specifically, when there is a large difference in the size of the windshield, such as windshields of compact cars and windshields of large-sized buses, processing to change the resolution for the object to be photographed may be performed according to the resolution for the photographed windshield, such that rough approximation is executed for the windshield region with a camera with high resolution and fine approximation is executed for the windshield region with a camera with low resolution. Distinction between large-sized cars and small cars can be made by extracting headlight regions of the vehicle 40 by labeling processing or the like from the image data to be processed after preprocessing, and estimating the size of the vehicle based on the left and right headlight positions and an interval between the left and right headlights indicated by the extracted regions.

Next, operation of the vehicle detection apparatus 100 and the vehicle detection system according to the present embodiment will be explained hereinafter, with reference to the flowchart of FIG. 7.

First, in the same manner as the first embodiment, a camera 20 transmits photographed image data to the vehicle detection apparatus 100 (ST11). The controller 150 of the vehicle detection apparatus 100 receives image data photographed by the camera 20. The controller 150 executes a vehicle detecting function and detects entry of the vehicle 40 (YES of ST12). Then, when the controller 150 detects entry of the vehicle 40, the controller 150 extracts a plurality of line-segment components indicating a boundary between the windshield region and the vehicle body of the vehicle 40 (ST13). When the controller 150 detects no entry of the vehicle 40, the controller 150 continues monitoring of vehicle entry (NO of ST12).

Next, the controller 150 classifies the extracted line-segment components according to directions, and determines whether an extraction result is good or not, based on the number and length of line-segment components for each direction (ST15). The determination is performed based on whether an extraction rate of the line-segment components is higher than a predetermined extraction rate or not.

When the extraction result is not good, the controller 150 changes parameters used in extraction of line-segment components, to increase the number of the line-segment components and reduce the length of the line-segment components (NO of ST15, ST14). The controller 150 re-executes the processing of extracting the line-segment components, based on the changed parameters (ST13).

On the other hand, when the extraction result is good, the controller 150 executes approximation with a polygon forming a closed loop, and generates candidates for the windshield region, using some of the line-segment components extracted for each of the left and right images, as described above. Then, the controller 150 executes processing of aligning at least one line-segment component between the left and right images, in the same manner as the above (ST16). Thereafter, the controller 150 measures and estimates the position of the vehicle 40 as described above (ST17).

As described above, according to the present embodiment, the controller 150 of the vehicle detection apparatus 100 includes a re-executing function (f2-1) of changing parameters used in extraction of line-segment components based on the number and length of line-segment components for each extracted direction, and re-executing the processing of extracting line-segment components. This structure enables improvement in the extraction rate in the case of extracting the line-segment components of the windshield region, in addition to the effect of the first embodiment.

The present embodiment can also achieve assured extraction of line segments of the windshield region as described above, even with the configuration in which parameters used in extraction of line-segment components are changed based on the size of the windshield region and processing of extracting line-segment components is re-executed. The present embodiment may be configured to use rectangle detection information of the number plate detected upon vehicle entry, and performing processing of correlation for information of four sides of the rectangle, when main line-segment components cannot be extracted even when detection of the windshield region has been attempted a plurality of times with changed processing parameters.

Specifically, the re-executing function (f2-1) of the controller 150 may be configured to include a first line-segment component extracting function (f2-1-1) of extracting a plurality of line-segment components forming the windshield region of the vehicle, and a second line-segment component extracting function (f2-1-2) of extracting a plurality of line-segment components forming a rectangular region of the number plate frame of the vehicle. Together with this, the polygon approximation function (f3) of the controller 150 can execute polygon approximation processing using line-segment components extracted by the second line-segment component extracting function (f2-1-2), when no closed loop can be formed based on line-segment components extracted by the first line-segment component extracting function (f-2-1-1).

The second line-segment component extracting function (f2-1-2) may include extracting a headlight region of the vehicle by labeling from an image of the image data to be processed that has been subjected to preprocessing, and extracting a rectangular shape similar to the number plate from a range estimated from the position thereof. Generally, a number plate exists under the center between the left and right headlights and under a line connecting the headlights. According to such a structure, the controller 150 executes polygon approximation processing using line-segment components extracted by the second line-segment component extracting function (f2-1-2), when no closed loop can be formed based on line-segment components extracted by the first line-segment component extracting function (f-2-1-1). Thus, even when line-segment components of the windshield region cannot be securely extracted, the position of the vehicle can be measured by extracting line-segment components of the number plate frame.

Third Embodiment

Figure 8:
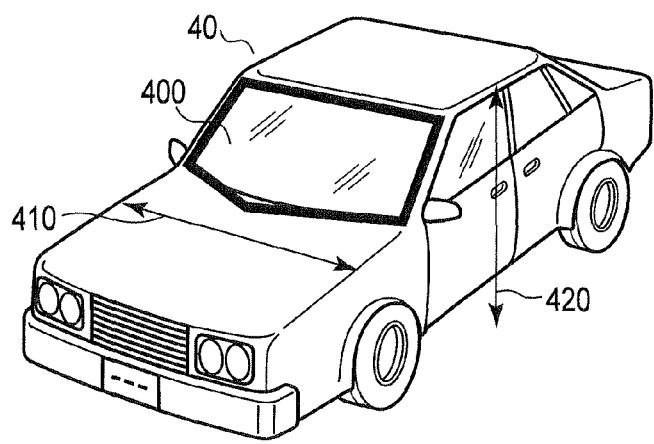
FIG. 8 is a diagram for explaining operation of measuring a vehicle width and a vehicle height, performed by a vehicle detection apparatus according to a third embodiment.

FIG. 8 is a diagram for explaining a third embodiment. A vehicle detection apparatus 100 and a vehicle detection system according to the present embodiment are the same as those of the first embodiment explained with reference to FIG. 1 and FIG. 2, and explanation thereof will be omitted.

As illustrated in FIG. 8, the vehicle detection apparatus 100 of the present embodiment is configured to calculate a vehicle width 410 and a vehicle height 420 of a vehicle 40. In the present embodiment, a controller 150 is configured to include a measuring function (f4) of measuring the vehicle position, which includes at least one of a vehicle height calculating function (f4-1) of calculating the vehicle height 420 and a vehicle width calculating function (f4-2) of calculating the vehicle width 410.

As illustrated in FIG. 8, the vehicle height calculating function (f4-1) calculates a height of and upper side of a windshield region 400 of the vehicle 40 as the vehicle height 420, based on coordinate information between the line-segment components used for the measuring function (f4). The vehicle width calculating function (f4-2) calculates a length of a bottom side of the windshield region 400 of the vehicle 40 as the vehicle width 410, based on the coordinate information.

Specifically, the vehicle height calculating function (f4-1) uses information (coordinate information between line-segment components) of line-segment components associated with each other between left and right cameras for line-segment components forming the windshield region 400. For example, as illustrated in FIG. 3 (B), when the controller 150 performs matching for vertical lines on the left and right side surface parts of the vehicle between the left and right cameras by the vehicle height calculating function (f4-1), the controller 150 calculates coordinate information of end points e1 and e2 of the line-segment component corresponding to the upper side of the windshield. Thus, the controller 150 performs matching for the line-segment component corresponding to the upper side of the windshield based on correlation between the coordinates, and thereby calculates the height 420 from the upper side of the windshield 400. The vehicle height calculating function (f4-1) may include calculating the height of the upper side of the windshield, by changing the configuration of the camera parameters and directly determining the correlation of a difference (e1−e2) between coordinate information items of the end points e1 and e2 of the upper side of the windshield.

On the other hand, as illustrated in FIG. 3 (B), when the controller 150 performs matching for vertical lines on the left and right side surface parts of the vehicle between the left and right cameras by the vehicle width calculating function (f4-2), the controller 150 calculates coordinate information of end points e6 and e3 of the line-segment component corresponding to the bottom side of the windshield. Thus, the controller 150 performs matching for the line-segment component corresponding to the bottom side of the windshield based on correlation between the coordinates, and thereby calculates a distance |e6−e3| between the end points of the bottom side of the windshield 400. The vehicle width calculating function (f4-2) may include calculating the distance "(e6−e5)+(e5−e4)+(e4−e3)" between the end points of the bottom side of the windshield, by changing the configuration of the camera parameters and directly determining differences (e6−e5), (e5−e4), and (e4−e3) between coordinate information items of the lower side of the windshield.

Next, operation of the vehicle detection system including the vehicle detection apparatus 100 according to the present embodiment will be explained hereinafter. The present embodiment is configured to add processing of calculating at least one of the vehicle height 420 and the vehicle width 410, in the processing of Step ST5 illustrated in FIG. 4.

Specifically, the controller 150 executes the steps of Steps ST1 to ST5 illustrated in FIG. 4. In such successive processing, the controller 150 measures the position of a closed loop as the vehicle position, based on coordinate information between the line-segment components aligned in the processing of Step ST4 and photographing position information (camera placement information) indicating the photographing position where the left and right images have been photographed (ST5).

In this case, the controller 150 calculates the height of the upper side of the windshield region 400 of the vehicle 40 as the vehicle height 420 by the vehicle height calculating function (f4-1), as illustrated in FIG. 8, based on coordinate information of the line-segment components aligned in the processing of Step ST4. In addition, the controller 150 calculates the length of the bottom side of the windshield region 400 of the vehicle 40 as the vehicle width 410 by the vehicle width calculating function (f4-2), as illustrated in FIG. 8, based on coordinate information of the line-segment components aligned in the processing of Step ST4. In the present embodiment, the controller 150 may execute one of the vehicle height calculating function (f4-1) and the vehicle width calculating function (f4-2).

The controller 150 notifies the ETC system 30 of the vehicle position (coordinates) measured by the processing of Step ST5, and the vehicle height 420 and/or vehicle width 410, through the network interface 140. The ETC system 30 transmits and receives wireless signals to and from an antenna of an ETC in-vehicle unit mounted onto the windshield, based on the position (coordinates) of the vehicle 40 and the assumed passing speed of the vehicle 40. In addition, the ETC system 30 can obtain additional information of the vehicle height 420 and/or the vehicle width 410, and calculate, for example, statistics of the size of vehicles passing through the ETC lane.

As described above, according to the present embodiment, the height of the upper side of the windshield region 400 of the vehicle 40 can be calculated as the vehicle height 420, based on the coordinate information. In addition, the length of the bottom side of the windshield region 400 of the vehicle 40 can be calculated as the vehicle width 410, based on the coordinate information. Thus, it is possible to estimate additional information of the vehicle height 420 and/or the vehicle width 410, in addition to the effect of the first or second embodiment.

According to at least one of the embodiments explained above, at least one line-segment component is aligned among a plurality of line-segment components indicating the boundary between the windshield region and the vehicle body of the vehicle between the left and right images. This structure can determine feature points which are correlated with each other between a plurality of images, clarify the alignment standard, and improve the vehicle detection accuracy.

Each of the methods described in the above embodiments can be stored and distributed as a computer-executable program in storage media such as magnetic disks (such as floppy (registered trademark) disks and hard disks), optical disks (such as CD-ROMs and DVDs), magneto-optical disks (MO), and semiconductor memories.

The storage media may adopt any storage form, as long as it is a storage medium that is capable of storing a program and readable by a computer.

An OS (operating system) operating on a computer, and MW (middleware), such as database management software and network software, may execute part of the above processing to achieve the above embodiments, based on instructions of the program installed in the computer from the storage medium.

In addition, the storage medium in each embodiment is not limited to a medium independent of the computer, but includes a storage medium which stores or temporarily stores a downloaded program transmitted through a LAN or the Internet.

The storage medium is not limited to one, and the storage medium in the present invention also includes the case where the processing in each of the above embodiments is performed from a plurality of media. The medium structure may be any of the above structures.

The computer in each embodiment executes the processing in each of the above embodiments based on a program stored in the storage medium, and may be any of a device such as a personal computer or the like, and a system formed by connecting a plurality of devices through a network.

The computer in each embodiment is not limited to a personal computer, but also includes a processing unit and a microcomputer included in an information processing apparatus, and is a general term for apparatuses and devices that are capable of achieving the functions of the present invention by a program.

Although some embodiments of the present invention have been explained above, these embodiments are presented as examples, and are not aimed at limiting the scope of the invention. These new embodiments can be carried out in other various forms, and various omissions, replacements, and changes are possible within the range not departing from the gist of the invention. These embodiments and modifications thereof are included in the scope and gist of the invention, and included in the inventions recited in the claims and the scope equal to them.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A vehicle detection apparatus comprising:
    a processor, the processor being configured to:
        detect a vehicle from an image obtained by photographing the vehicle, the image including a left image and a right image that are photographed from left and right directions with respect to the vehicle;
        extract a plurality of line-segment components indicating a boundary between a specific region of the vehicle and a vehicle body and included in the image for each of the left and right images; and
        align at least one line-segment component between the left and right images among the line-segment components forming a closed loop for each of the left and right images, and measure a position of the closed loop as the position of the vehicle based on coordinate information between the aligned line-segment components and photographing position information where the left and right images have been photographed.

2. The vehicle detection apparatus according to claim 1, wherein the processor is further configured to:
    execute a polygon approximation by executing approximation with a polygon forming the closed loop using some of the line-segment components extracted from the image, for each of the left and right images.

3. The vehicle detection apparatus according to claim 1, wherein the processor is configured to align all of the line-segment components forming the closed loop.

4. The vehicle detection apparatus according to claim 1, wherein left and right photographing positions of the photographing module are placed to include a windshield of the vehicle and side surfaces of the vehicle, and are arranged along a direction substantially parallel with a longitudinal direction of an upper side and a lower side of the windshield.

5. The vehicle detection apparatus according to claim 1, wherein the processor is further configured to:
classify the extracted line-segment components according to directions, change parameters used in extraction of the line-segment components based on a number and a length of the line-segment components for each of the directions to increase the number of the line-segment components and reduce the length of the line-segment components, and re-execute processing of extracting the line-segment components based on the changed parameters.

6. The vehicle detection apparatus according to claim 2, wherein the processor is further configured to:
extract a plurality of first line-segment components forming the windshield region of the vehicle; and
extract a plurality of second line-segment components forming a rectangular region of a number plate frame of the vehicle, and
wherein the processor executes the polygon approximation using the extracted second line-segment components, when the closed loop cannot be formed based on the extracted first line-segment components.

7. The vehicle detection apparatus according to claim 5, wherein the processor changes the parameters used in extraction of the line-segment components to reduce the number of the line-segment components and increase the length of the line-segment components when the windshield region has a size greater than a reference size, and to increase the number of the line-segment components and reduce the length of the line-segment components when the windshield region has a size equal to or less than the reference size.

8. The vehicle detection apparatus according to claim 1, wherein the processor is further configured to calculate a length of a bottom side of the windshield region of the vehicle as a width of the vehicle, based on the coordinate information.

9. The vehicle detection apparatus according to claim 1, wherein the processor is further configured to calculate a height of an upper side of the windshield region of the vehicle as a height of the vehicle, based on the coordinate information.

10. A vehicle detection method applied to a vehicle detection apparatus detecting a vehicle from an image obtained by photographing the vehicle, the image including a left image and a right image that are photographed from left and right directions with respect to the vehicle, and the method comprising:
extracting a plurality of line-segment components indicating a boundary between a specific region of the vehicle and a vehicle body and included in the image for each of the left and right images; and
aligning at least one line-segment component between the left and right images among the line-segment components forming a closed loop for each of the left and right images, and measuring a position of the closed loop as the position of the vehicle based on coordinate information between the aligned line-segment components and photographing position information where the left and right images have been photographed.

* * * * *